(12) United States Patent
Chen

(10) Patent No.: US 7,781,691 B2
(45) Date of Patent: Aug. 24, 2010

(54) BEZEL ASSEMBLY FOR COMPUTER

(75) Inventor: Yong-Song Chen, Shenzhen (CN)

(73) Assignees: Hon Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 910 days.

(21) Appl. No.: 11/611,145

(22) Filed: Dec. 15, 2006

(65) Prior Publication Data
US 2007/0235305 A1 Oct. 11, 2007

(30) Foreign Application Priority Data
Apr. 5, 2006 (CN) .................. 2006 2 0013426

(51) Int. Cl.
*H01H 13/70* (2006.01)
(52) U.S. Cl. ..................................... 200/343
(58) Field of Classification Search ............... 200/343, 200/296, 293, 331, 332, 337, 556, 341
See application file for complete search history.

(56) References Cited

U.S. PATENT DOCUMENTS

| | | | | |
|---|---|---|---|---|
| 6,570,111 B2 * | 5/2003 | Nakagawa et al. | .......... | 200/343 |
| 6,914,206 B2 * | 7/2005 | Mukougawa | ................ | 200/556 |
| 7,102,090 B2 * | 9/2006 | Morisada | .................... | 200/296 |

* cited by examiner

*Primary Examiner*—Edwin A. Leon
(74) *Attorney, Agent, or Firm*—Wei Te Chung

(57) ABSTRACT

A bezel assembly includes a bezel, a button, a rotating member, and an elastic member engagable with the bezel and the rotating member for restoring the rotating member. The bezel defines a through hole therein, and the button is installed in the through hole. The rotating member is mounted to an inside surface of the bezel, and the rotating member is engagable with the button and rotatable upon manipulation of the button for controlling a functional component behind the bezel.

16 Claims, 5 Drawing Sheets

BEZEL ASSEMBLY FOR COMPUTER

BACKGROUND OF THE INVENTION

1. Field of the Invention

The present invention relates to a bezel assembly, and more particularly to a bezel assembly for a computer.

2. Description of Related Art

An electronic apparatus, such as a typical desktop computer, usually includes a functional component, such as a compact disk read-only memory (CD-ROM) drive, a digital video disc (DVD) drive, a floppy disk drive, and the like. These devices are typically installed in the desktop computer, and front ends of the devices are typically shown at a front bezel of the desktop computer for facilitating use. However, ornamental designs of the devices are typically unharmonious with a style of the front bezel. To address the problem, manufacturers are trying to hide the devices fully behind the front bezel. There arises a problem of how to control the devices.

What is needed, therefore, is a bezel assembly which is suitable for a computer having a functional component concealingly installed therein.

SUMMARY OF THE INVENTION

An exemplary bezel assembly includes a bezel, a button, a rotating member, and an elastic member engagable with the bezel and the rotating member for restoring the rotating member. The bezel defines a through hole therein, and the button is installed in the through hole. The rotating member is mounted to an inside surface of the bezel, and the rotating member is engagable with the button and rotatable upon use of the button for controlling a functional component behind the bezel.

Other advantages and novel features will become more apparent from the following detailed description of preferred embodiment when taken in conjunction with the accompanying drawings, in which:

DETAILED DESCRIPTION OF THE INVENTION

Figure 1:
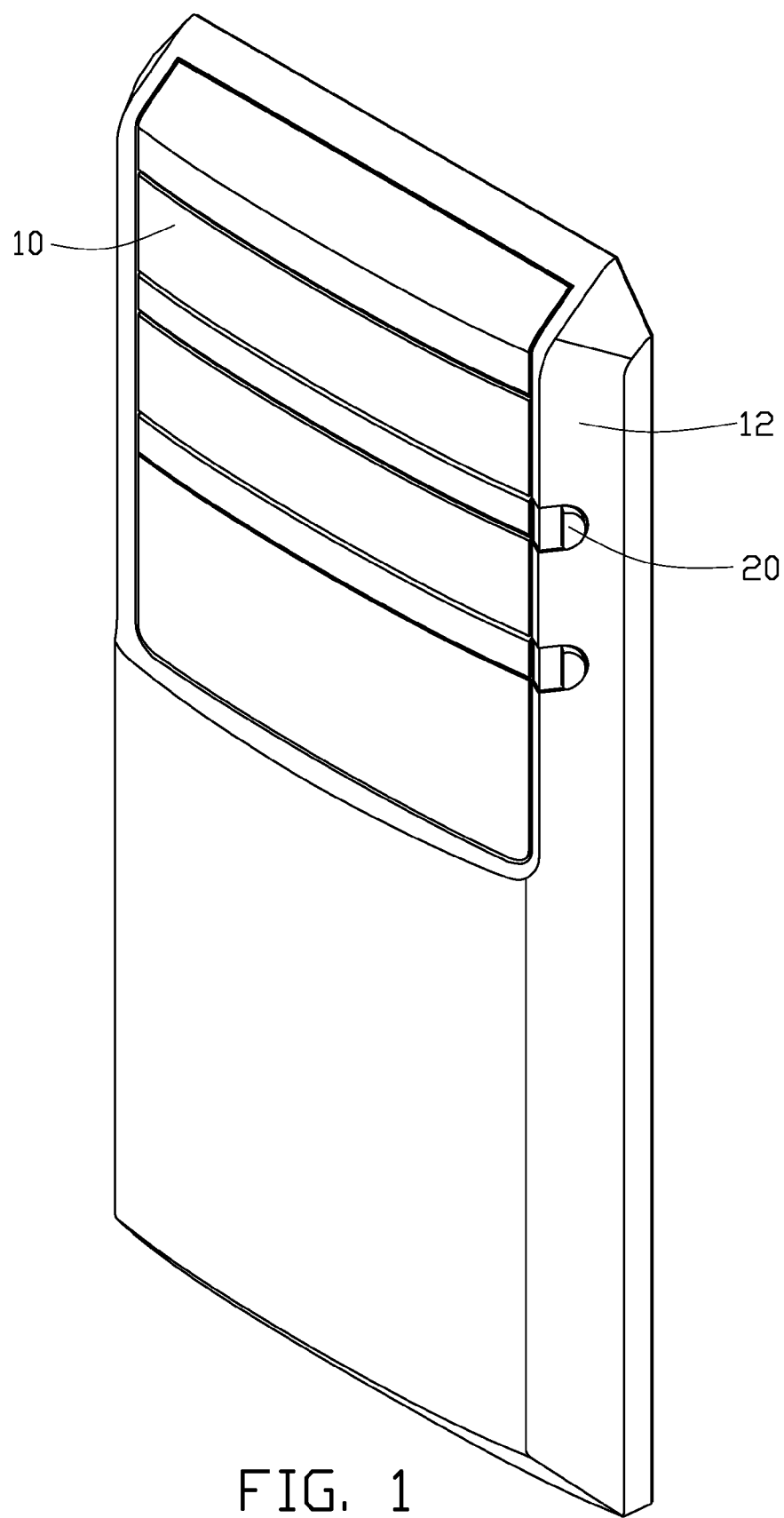
FIG. 1 is an assembled view of a bezel assembly in accordance with a preferred embodiment of the present invention.
Figure 2:
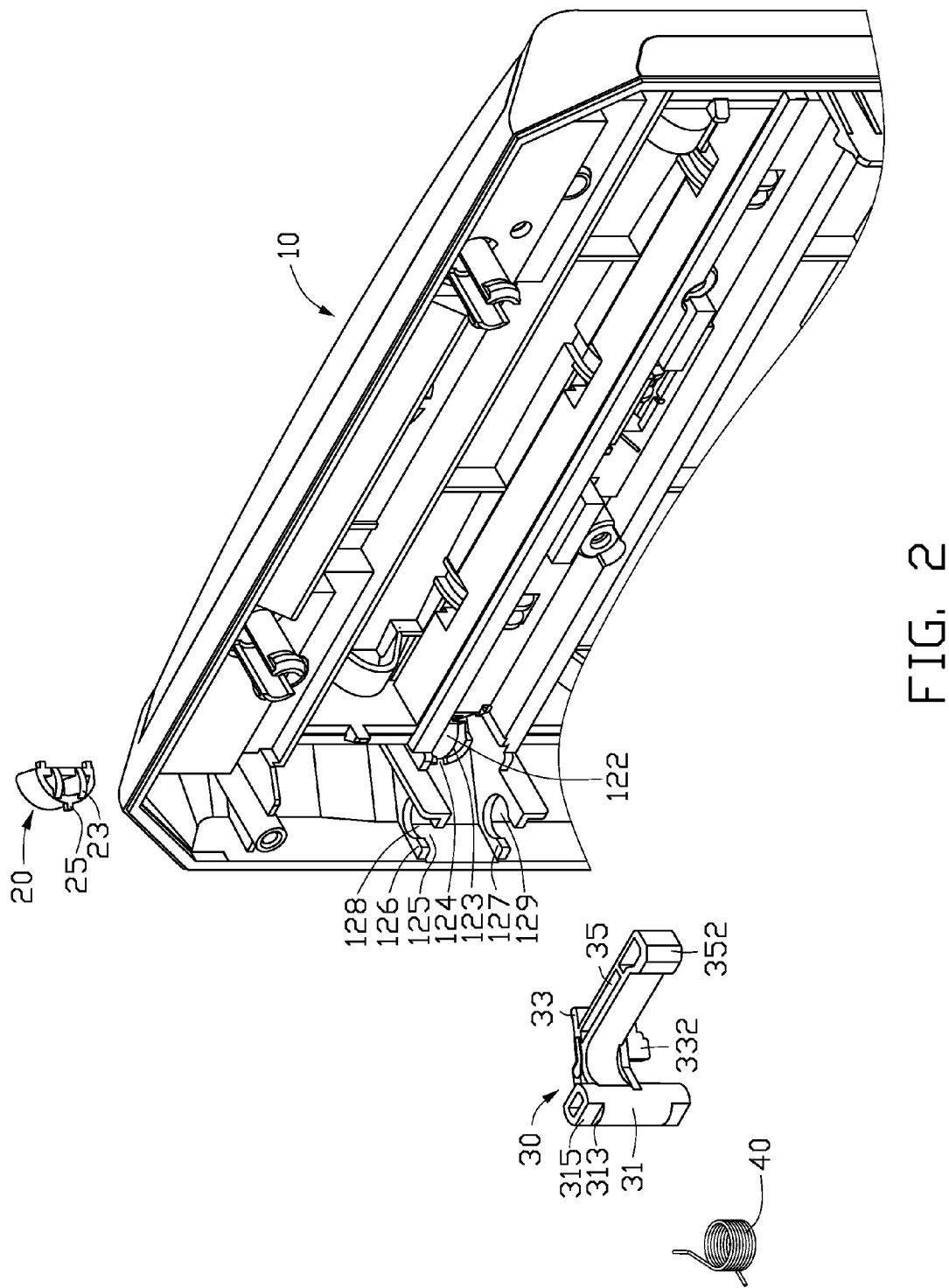
FIG. 2 is an exploded, partially enlarged isometric view of FIG. 1, but viewed from another aspect, the bezel assembly including a bezel, a button, a rotating member, and an elastic member.

Referring to FIGS. 1 to 2, a bezel assembly for a computer is provided in accordance with a preferred embodiment of the present invention. The bezel assembly includes a bezel 10, a button 20, a rotating member 30, and an elastic member 40 for restoring the rotating member 30. In this embodiment, the button 20 is used for controlling tray ejection of a compact disk read-only memory (CD-ROM) drive 50 (see FIG. 5) installed in the computer and fully hidden behind the front bezel 10, and the elastic member 40 is a torsion spring.

The bezel 10 includes a middle wall allowing the CD-ROM drive 50 to be mounted thereto and two sidewalls 12 extending slantingly outward from opposite longitudinal edges of the middle wall. One of the sidewalls 12 has a through hole 122 defined therein. A flange 123 is formed on an inside surface of the sidewall 12 around the through hole 122, and a plurality of spaced notches 124 is defined in the flange 123. A first plate 126 and a second plate 127 are formed on the inside surface of the sidewall 12 generally above and below the through hole 122 respectively. Two fixing holes 128,129 are defined in the first plate 126 and the second plate 127 respectively. Two narrow cutouts 125 are defined by cutting free edges of the first plate 126 and the second plate 127 respectively, the cutouts 125 communicating with the corresponding fixing holes 128, 129.

A pushing portion 23 is formed on a rear surface of the button 20, and a plurality of blocks 25 is formed on a rear edge of the button 20, corresponding to the notches 124 of the flange 123 around the through hole 122 of the sidewall 12.

Figure 3:
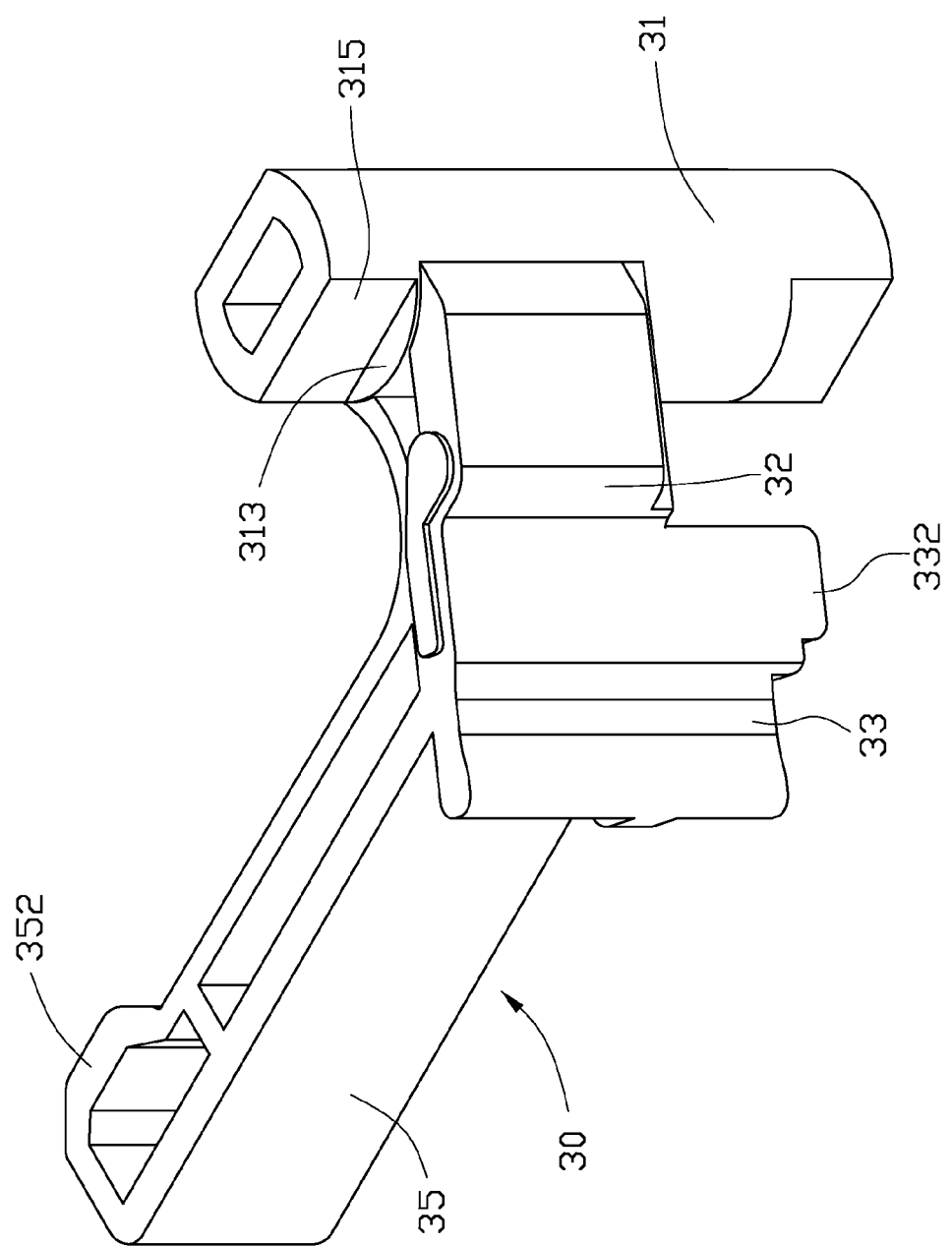
FIG. 3 is an enlarged isometric view of the rotating member of FIG. 2, but viewed from another aspect.

Referring also to FIG. 3, the rotating member 30 includes a columnar rotating shaft 31, a push arm 35, and an arcuate interconnecting portion 32 connecting a generally upper portion of the rotating shaft 31 and the push arm 35. The external diameter of the rotating shaft 31 is equal to the diameters of the fixing holes 128, 129 of the first plate 126 and the second plate 127. Four vertical, planar cutting faces 31 5 and four horizontal, planar step faces 313 are formed on two opposite sides of a top end and a bottom end of the rotating shaft 31 respectively, by cutting out a section thereof, to allow the rotating shaft 31 to pass through the cutouts 125 and enter the fixing holes 128, 129 of the first plate 126 and the second plate 127. The interconnecting portion 32 forms an engaging section 33 located adjacent the push arm 35 and apart from the rotating shaft 31. A supporting section 332 depends from a bottom end of the engaging section 33. The push arm 35 extends rearward from the interconnecting portion 32 in parallel to the cutting faces 315 of the rotating shaft 31. A protrusion 352 is formed on a free end of the push arm 35.

Figure 4:
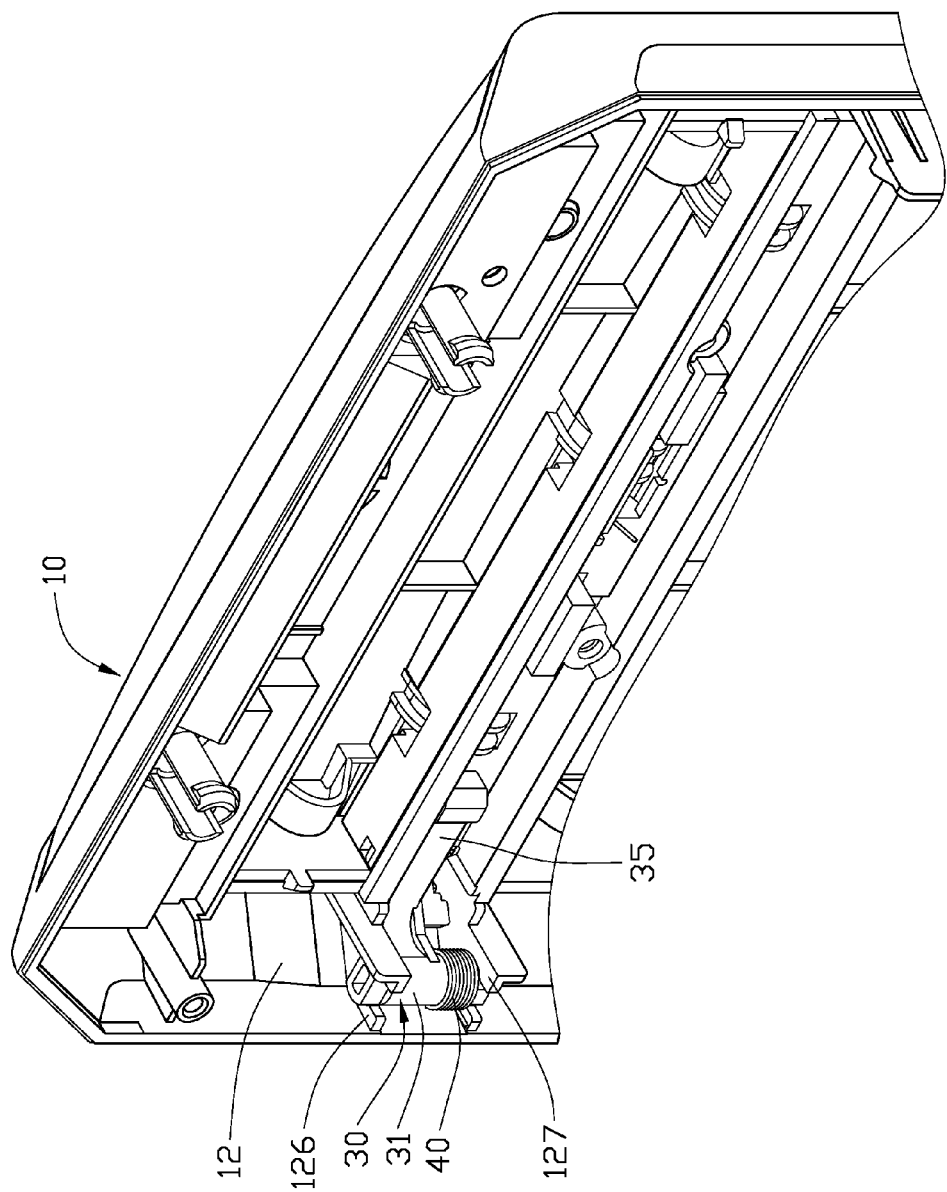
FIG. 4 is an assembled view of FIG. 2.

Referring further to FIG. 4, in assembly, the button 20 extends through the through hole 122 from the inside surface of the sidewall 12 and is accessible from outside of the bezel 10, and the blocks 25 of the button 20 engage in the corresponding notches 124 of the flange 123 around the through hole 122. The elastic member 40 is placed around a generally lower portion of the rotating shaft 31 of the rotating member 30, and a first end of the elastic member 40 is fixed to the rotating shaft 31. The rotating member 30 is rotated to allow the top end and the bottom end of the rotating shaft 31 to pass through the cutouts 125 and engage in the fixing holes 128, 129 of the first plate 126 and the second plate 127. The elastic member 40 is generally located above a top surface of the second plate 127. The supporting section 332 of the rotating member 30 is supported on the second plate 127. The rotating member 30 is then rotated until the engaging section 33 of the interconnecting portion 32 abuts against the pushing portion 23 of the button 20. A second end of the elastic member 40 is fixed to the second plate 127, or the inside surface of the sidewall 12 adjoining the second plate 127. Thereby, the rotating member 30 is mounted between the first plate 126 and the second plate 127 in an initial state, where the push arm 35 locates adjacent the inside surface of the bezel 10.

Figure 5:
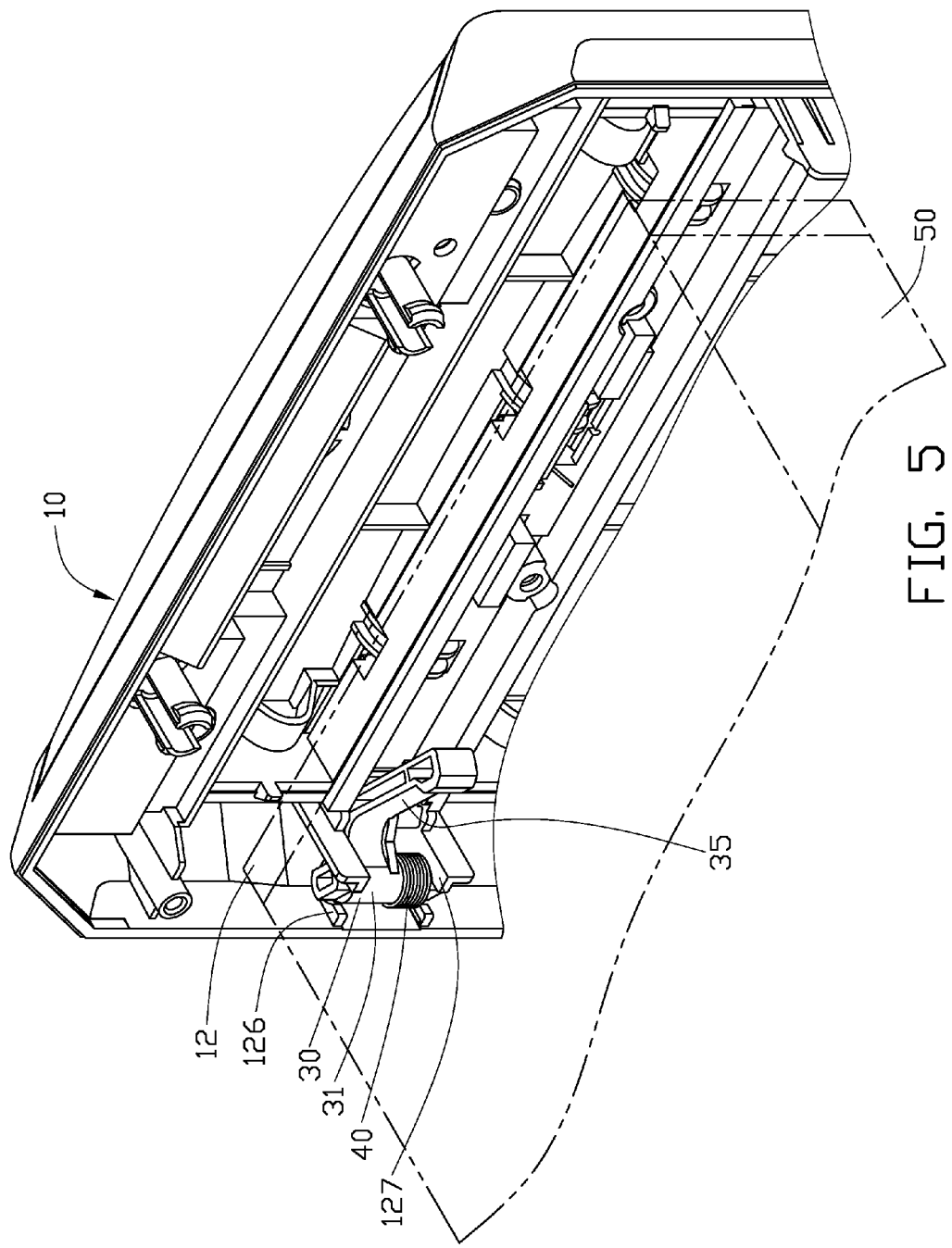
FIG. 5 is similar to FIG. 4, showing the rotating member engaging with a functional component.

Referring further to FIG. 5, the button 20 is pressed from outside of the bezel 10, and pushes the engaging section 33 of the rotating member 30 to rotate the rotating member 30 in the fixing holes 128, 129 of the first plate 126 and the second plate 127. The elastic member 40 is deformed, and the push arm 35 is rotated away from the middle wall of the bezel 10 with the rotation of the rotating shaft 31, until the protrusion 352 of the push arm 35 abuts against and presses a switch button of the CD-ROM drive 50 in the computer. A tray of the CD-ROM drive 50 thereby ejects. A user can then use the CD-ROM drive 50. After that, the button 20 is released, and the elastic member 40 is restored to reversely rotate the rotating shaft 31 and the push arm 35 simultaneously rotates toward the middle wall of the bezel 10. In this embodiment, only one button 20 is visible from out of the bezel 10 thereby eliminating a negative influence of the CD-ROM drive 50 to ornamental style of the bezel 10.

It is believed that the present embodiment and its advantages will be understood from the foregoing description, and it will be apparent that various changes may be made thereto without departing from the spirit and scope of the invention or sacrificing all of its material advantages, the example hereinbefore described merely being preferred or exemplary embodiment of the invention.

What is claimed is:

1. A bezel assembly comprising:
   a bezel comprising a sidewall;
   a functional component installable with respect to the bezel and shielded from being directly functionally manipulated from outside of the bezel;
   a button installed in the sidewall and accessible from outside of the sidewall; and
   a rotating member pivotably mountable to an inside surface of the bezel, the rotating member comprising an engaging section, and a push arm extending from the engaging section with an angle formed therebetween, the button being capable of driving the rotating member at the engaging section thereof to rotate with a result of the push arm rotating rearward to abut against the functional component,
   wherein two plates are formed on an inside surface of the sidewall, two aligned fixing holes are defined in the plates respectively, the rotating member is mounted between the plates and further comprises a rotating shaft pivotably engaged in the fixing holes.

2. The bezel assembly as claimed in claim 1, wherein the sidewall of the bezel defines a through hole therein, a flange with a notch defined therein is formed on an inside surface of the sidewall around the through hole, a block is formed on a rear edge of the button for engaging in the notch.

3. The bezel assembly as claimed in claim 1, wherein each of the plates defines a narrow cutout in communication with the corresponding fixing hole, two cutting faces are formed on a top end and a bottom end of the rotating shaft respectively, to allow the rotating shaft to pass through the cutouts and engage in the fixing holes.

4. The bezel assembly as claimed in claim 1, further comprising an elastic member, the elastic member is placed around the rotating shaft, a first end of the elastic member is fixed to the rotating shaft, and a second end of the elastic member is fixed to one of the plates or the inside surface of the sidewall.

5. The bezel assembly as claimed in claim 1, wherein a supporting section is formed on a bottom of the rotating member for supporting the rotating member on a lower one of the plates.

6. A bezel assembly comprising:
   a bezel defining a through hole therein;
   a button installed in the through hole in the bezel;
   a functional component installed behind the bezel;
   a rotating member mounted to an inside surface of the bezel, the rotating member engaged with the button and rotated in response to manipulation of the button to control the functional component; and
   an elastic member engaged with the bezel and the rotating member to restore the rotating member,
   wherein the bezel comprises two sidewalls and a middle wall disposed between the sidewalls, the through hole is defined in one of the sidewalls, a plate is formed on an inside surface of the one of the sidewalls adjacent the through hole, a fixing hole is defined in the plate, the rotating member comprising a rotating shaft pivotably engaged in the fixing hole.

7. The bezel assembly as claimed in claim 6, wherein a flange is formed on an inside surface of the one of the sidewalls around the through hole, a plurality of spaced notches is defined in the flange, and a plurality of blocks is formed on a rear edge of the button for engaging in the notches in the flange respectively.

8. The bezel assembly as claimed in claim 6, wherein the plate defines a narrow cutout in communication with the fixing hole, a cutting face is formed on a free end of the rotating shaft to allow the rotating shaft to pass through the cutout and engage in the fixing hole.

9. The bezel assembly as claimed in claim 6, wherein the elastic member is placed around the rotating shaft, with a first end fixed to the rotating shaft, and a second end fixed to one of the plate and the inside surface of the one of the sidewalls.

10. The bezel assembly as claimed in claim 6, wherein the rotating member further comprises a push arm, and an interconnecting portion is connected between the rotating shaft and the push arm.

11. The bezel assembly as claimed in claim 10, wherein the interconnecting portion forms an engaging section driven by the button.

12. The bezel assembly as claimed in claim 10, wherein a supporting section is formed on a bottom of the interconnecting portion for supporting the rotating member on the plate of the sidewall of the bezel.

13. The bezel assembly as claimed in claim 10, wherein a protrusion is formed on a free end of the push arm to control the functional component.

14. A bezel assembly comprising:
   a bezel comprising a main body and a side wall extending rearward from one side edge of the main body, the side wall defining a through hole;
   a functional component installed behind the bezel;
   a rotating member installed to an inner side of the bezel and comprising a rotating shaft pivotably mounted to the inner side of the bezel, an engaging section, and a push arm;
   a button slidably installed in the through hole, and pushing the engaging section rearward to rotate the rotating member about the shaft from its original state to a pushed state in response to manipulation of the button, which results in the push arm rotating rearward to abut against a switch button of the functional component; and
   an elastic member to restore the rotating member to its original state, wherein the elastic member comprises a torsion spring surrounding the shaft configured for exerting a torque force to the shaft to actuate the rotating member returning back to its original state.

15. The bezel assembly as claimed in claim 14, wherein the rotating member comprises an interconnecting portion extending from a circumference surface of the shaft in a first direction, the push arm extending from the interconnecting portion in a second direction different from the first direction, the engaging section being formed at a distal end of the interconnecting portion.

16. The bezel assembly as claimed in claim 14, wherein a pair of plates extends from the inner side of the bezel, each of the plates defines a large pivotal hole and a small entrance communicating with the large pivotal hole, the shaft comprises a pair of pivotal connecting portions each have a cross section with a narrow side and a wide side, the pivotal connecting portions being capable of passing through the small entrance via the narrow side aligning with the entrance to be blocked in the large pivotal hole via moving the narrow side away from the entrance.

* * * * *